United States Patent Office 3,780,002
Patented Dec. 18, 1973

3,780,002
BROAD MOLECULAR WEIGHT BUTYL RUBBER PROCESS
Edward N. Kresge, Watchung, and Francis P. Baldwin, Summit, N.J., assignors to Esso Research and Engineering Company
No Drawing. Continuation of abandoned application Ser. No. 778,824, Nov. 25, 1968. This application Feb. 19, 1971, Ser. No. 117,122
Int. Cl. C08d 1/14, 3/04, 3/10
U.S. Cl. 260—85.3 R          5 Claims

ABSTRACT OF THE DISCLOSURE

Butyl rubbers of broad molecular weight distribution are prepared using a catalyst system which comprises a halide of the Group II or Group III metals in conjunction with the tetrahalide of a metal selected from Group IV or alternately, boron trifluoride in conjunction with an aluminum compound selected from the group consisting of aluminum tribromide and aluminum triiodide.

This application is a continuation of Ser. No. 778,824, filed Nov. 25, 1968, now abandoned.

BACKGROUND OF THE INVENTION

It is well known in the art to prepare butyl rubber by reacting an isoolefin with a diolefin in the presence of a catalyst such as aluminum chloride. In general, the molecular weight distribution of these polymers is fortuitously determined by the particular process used. Little or no control over molecular weight distribution is generally possible in these prior art methods.

The physical properties and polymer processing characteristics are well known to depend on weight average molecular weight ($\overline{M}_w$) and number average molecular weight ($\overline{M}_n$). In general, the tensile strength and modulus of vulcanizates are dependent on number average molecular weight (P. J. Flory, "Principles of Polymer Chemistry," Cornell University Press, 1953, p. 485). The processability of elastomers is dependent both on $\overline{M}_w$ and $\overline{M}_w/\overline{M}_n$. For example, the mill behavior of several rubbers has been classified relative to $\overline{M}_w/\overline{M}_n$. [J. Applied Polymer Sci., vol. 12, pp. 1589–1600 (1968).]

Butyl rubber having a broad molecular weight distribution has been found to exhibit excellent Banbury mixing characteristics and is very resistant to flow under storage conditions (cold flow). The molecular weight distribution of butyl rubber also controls the extent of extrusion die swell. Therefore, to insure fabricated articles that are of constant size and shape, it is highly useful to control both the weight average molecular weight and the distribution of molecular species in the rubber within set limits.

Butyl rubbers with broad molecular weight distribution also have enhanced green strength over narrower molecular weight distribution rubbers. The improved green strength or uncured stock strength results in improved manufacturing operations (e.g. inner tube manufacture) in that the uncured rubber articles are much stronger and less subject to distortion.

It is known that alpha olefins may be polymerized using a halide of Group II or Group III metals in conjunction with heavy transition metal trihalides, see for example U.S. Pat. 3,298,965. Similarly, these alpha olefins are known to be polymerized by catalysts prepared by reacting titanium tetrachloride with a trialkyl aluminum compound, e.g. triethyl aluminum; see for example U.S. Pat. 3,317,496 incorporated herein by reference.

SUMMARY OF THE INVENTION

It has surprisingly been found that butyl rubber having a broad molecular weight distribution may be prepared from a mixture of an isoolefin and a nonconjugated diolefin using a catalyst mixture of at least one halide of a Group II or Group III metal in conjunction with the tetrahalide of a metal selected from Group IV of the Periodic Table of the Elements.

The rubbers so formed exhibit high green strength and low cold flow characteristics. Additionally, the product is readily processed by milling, etc., and may be extruded at higher rates than conventional butyl rubber.

DETAILED DESCRIPTION

This invention relates to a process for preparing homopolymers and copolymers from cationically polymerizable monomers having a broad molecular weight distribution. In particular, this invention relates to a process for preparing butyl rubbers having broad molecular weight distribution.

The term "molecular weight distribution" (MWD) as used in the specification and claims means the ratio of the weight average molecular weight ($\overline{M}_w$) to the number average molecular weight ($\overline{M}_n$).

The molecular weight distribution ($\overline{M}_w/\overline{M}_n$) of butyl rubber may be readily determined by the technique of gel permeation chromatography described in J. of Polymer Sci., Part A, vol. 2, pp. 835–843, and Am. Chem. Soc. Polymer Preprints, vol. 5, No. 2, pp. 706–727 (1964). The results obtained by this method have been standardized against those obtained by the classical techniques of light scattering and osmometry. A description of the light scattering and osmometry techniques may be found in "Techniques of Polymer Characterization" by P. W. Allen, pages 2–5, Butterworth's Publications, Ltd., London, England, 1959.

The term "butyl rubber" as employed in the specification and claims is intended to include copolymers made from a polymerization reactant mixture having therein about 70 to 99.5% by weight of an isoolefin which has about 4 to 7 carbon atoms and about 30 to 0.5% by weight of a conjugated multiolefin having about 4 to 14 carbon atoms. The resultant copolymer contains about 85 to 99.5% of combined isoolefin and 0.5 to 15% of combined multiolefin. The term "butyl rubber" is described in an article by R. M. Thomas et al. in Industrial Engineering and Chemistry, vol. 32, pp. 1283 et seq., October 1940.

The butyl rubber generally has a viscosity average molecular weight between about 100,000 to about 800,000; preferably about 250,000 to about 600,000 and a Wijs Iodine No. of about 0.5 to about 50, preferably 1 to 20. The preparation of butyl rubber is described in U.S. Pat. 2,356,128 which is incorporated herein by reference.

The term "broad molecular weight distribution" as used in the specification and claims means a $\overline{M}_w/\overline{M}_n$ of greater than 5.0.

In its preferred embodiment the catalyst system comprises at least one halide of the Group II or Group III metals of the Periodic Table of the Elements in conjunction with at least one tetrahalide of metals selected from Group IV of the Periodic Table of the Elements.

Illustrative of such catalyst systems are aluminum trichloride-tin tetrachloride; aluminum tribromide-tin tetrachloride; aluminum trichloride-titanium tetrabromide; aluminum trichloride-titanium tetrachloride; and aluminum trichloride-germanium tetrachloride.

A particularly useful catalyst system in the practice of this invention which does not fit into the broad class described above is boron trifluoride in conjunction with an aluminum compound where said compound is aluminum bromide or aluminum iodide. The mole ratio of these two components is not critical. Preferably, however, the mole ratio of aluminum compound to boron trifluoride is about 0.1:1 to about 10:1; more preferably about 0.5:1 to about 8:1; most preferably about 0.8:1 to about 6:1, e.g. about 1:1 to about 4:1.

The term "halide of Group II or Group III metal" as used in the specification and claims means halides of metals having a valence state of less than 4. The higher halides are excluded from the definition of this term. Illustrative of these halides are aluminum trichloride, aluminum tribromide, zinc dichloride, magnesium dichloride, gallium trichloride, etc.

The tetrahalides which may be used in the practice of this invention include the transition metal tetrahalides. Illustrative of the tetrahalides of this invention are titanium tetrachloride, titanium tetrabromide, vanadium tetrafluoride, tin tetrachloride, germanium tetrachloride, bismuth tetrachloride, etc.

The catalyst components of the catalyst system of this invention must each be active catalysts independently capable of initiating polymerization of the cationically polymerizable monomers of this invention. Broadly speaking, each component must fit into the class of compounds known to the art as Friedel-Crafts catalysts. These Friedel-Crafts compounds are described in an article by N. O. Calloway in Chemical Reviews, vol. 17, No. 3, p. 327, which is incorporated herein by reference.

In addition to the Friedel-Crafts components described above, one of the components may be prepared in situ. For example, an aluminum trialkyl may be reacted with a hydrogen halide or an organohalide where the organohalide is a tertiary halide or an allyl halide.

The ratio of the tetrahalide of this invention to the Group II or Group III halide is preferably about 0.1:1 to about 2:1; more preferably 0.25:1 to about 1.5:1; most preferably about 0.5:1 to about 1.25:1, e.g. 1:1.

The catalyst of this invention is utilized in catalytic amounts. For example, on a weight basis the catalyst may be employed at about 0.001/1 to about 0.01/1 wt. percent catalyst to wt. percent monomer; more preferably about 0.0025/1 to about 0.0075/1, e.g. 0.005/1.

The polymerization of the monomers is to be carried out in the manner of the prior art method of preparing butyl rubber. The only variation is the substitution of the mixed catalysts of this invention for the conventionally used catalyst. The advantages of this invention may be more readily appreciated by reference to the following examples.

Example 1

Butyl rubber was prepared by polymerization in a stainless steel dry box under a nitrogen atmosphere. The purity of the chemicals was insured by methods well known in the art. (For example, see J. P. Kennedy and R. M. Thomas, J. Polymer Sci., 46, 481 (1960).) Isoprene was distilled just before use. All experiments were carried out in round bottom flasks equipped with thermowell and stirrer. The polymerization temperature was maintained by using liquid nitrogen as a coolant on the outside of the flask.

After polymerization, the reactions were quenched with cold methanol and the polymers dried under vacuum at 50° C. Percent conversions of the monomer were calculated from the final dried weight of the butyl rubber.

The butyl rubber was then characterized for molecular weight and molecular weight distribution by gel permeation chromatography. The mole percent isoprene (mole percent unsaturation) was determined by iodine number.

About 9.7 ml. of isobutylene and about 0.3 ml. of isoprene were dissolved in 30 ml. of methyl chloride at −100° C. The catalyst was dissolved in methyl chloride to the extent of about 0.25 wt. percent. About 0.2 ml. of this catalyst solution was used in each of the following runs. The polymerization took place at −100° C.±2° C. In all experiments the monomer conversion was kept less than 10% to insure that the concentration of monomers was essentially constant.

Table I shows the results of three experiments, A, B, C, wherein the catalysts were respectively aluminum trichloride, titanium tetrachloride, and tin tetrachloride.

TABLE I

| Exp. | Catalyst | Percent conversion | Weight average chain length[a] | $\bar{M}_w \times 10^{-3}$ | $\bar{M}_w/\bar{M}_n$[a] | Mole percent unsat.[b] |
|---|---|---|---|---|---|---|
| A | AlCl$_3$ | 8.7 | 7,700 | 330 | 4.7 | 1.20 |
| B | TiCl$_4$ | 2.9 | 5,130 | 220 | 3.7 | 1.20 |
| C | SnCl$_4$ | 3.6 | 4,420 | 190 | 3.9 | |

[a] Data obtained by gel permeation chromatography.
[b] Iodine number.

It will be noted that in all cases the molecular weight distribution as expressed by $\bar{M}_w/\bar{M}_n$ is less than 5.0, the highest value being 4.7 for the aluminum chloride catalyst. It is of particular interest that the use of catalysts other than aluminum chloride resulted in a $\bar{M}_w/\bar{M}_n$ of less than 4.7. In all experiments the monomer conversion was kept less than 10% to insure that the concentration of monomers was essentially constant.

Example 2

An isobutylene-isoprene feed of Example 1 was polymerized in the manner of Example 1 using various catalyst systems including the mixed catalyst of this invention. The results are shown in Table II.

TABLE II

| Exp. | Catalyst | Percent conversion | Weight average chain length[a] | $\bar{M}_w/\bar{M}_n$[a] | Mole percent unsat.[b] | $\bar{M}_w \times 10^{-3}$ |
|---|---|---|---|---|---|---|
| A | AlCl$_3$ | 8.7 | 7,700 | 4.7 | 1.20 | 330 |
| D | TiCl$_4$AlCl$_3$[c] | 3.9 | 10,600 | 5.0 | 1.32 | 456 |
| E | SnCl$_4$AlCl$_3$[c] | 4.5 | 7,940 | 7.1 | 1.11 | 342 |

[a] Gel permeation chromatography.
[b] I$_2$ number.
[c] 1:1 mole ratio.

It will be noted that Experiment A wherein aluminum chloride was used as the catalyst, the $\bar{M}_w/\bar{M}_n$ is 4.7. By comparison, where aluminum chloride is used in conjunction with titanium tetrachloride, the $\bar{M}_w/\bar{M}_n$ is 5.0. Where the catalyst mixture is aluminum chloride and tin tetrachloride, the $\bar{M}_w/\bar{M}_n$ is 7.1. These experiments serve to show that a broader molecular weight butyl rubber is obtained by using mixtures of aluminum chloride with either titanium tetrachloride or tin tetrachloride than is obtained by using the aluminum trichloride alone.

Example 3

The experiments of Example 2 were repeated using aluminum chloride and tin tetrachloride in varying ratios in order to determine the effect of the ratio of the two different catalysts. The results of these experiments are shown in Table III.

TABLE III.—BUTYL POLYMERIZATIONS WITH MIXED CATALYSTS

| Exp. | Catalyst | Molar ratio | Percent conversion | $\bar{M}_w \times 10^{-3}$[a] | $\bar{M}_w/\bar{M}_n$[a] | Mole percent unsat.[b] |
|---|---|---|---|---|---|---|
| A | SnCl$_4$/AlCl$_3$ | 0/1 | 8.7 | 330 | 4.7 | 1.20 |
| B | SnCl$_4$/AlCl$_3$ | 0.5/1 | 5.0 | 446 | 6.6 | 1.38 |
| C | SnCl$_4$/AlCl$_3$ | 1/1 | 5.6 | 375 | 7.6 | 1.33 |

[a] Gel permeation chromatography.
[b] I$_2$ number.

Hence, it is shown that the molecular weight distribution can be controlled over a wide range of $\bar{M}_w/\bar{M}_n$ by employing different ratios of the catalysts. As the ratio of tin tetrachloride to aluminum chloride is increased, the $\bar{M}_w/\bar{M}_n$ is increased from 4.7 (Exp. A, no tin tetrachloride) to 7.6 (Exp. C, equimolar tin tetrachloride/ aluminum trichloride).

It will be obvious to one skilled in the art that many different embodiments of this invention may be made without departing from the spirit thereof. It is therefore not intended that this invention be limited to the examples disclosed herein.

We claim:

1. In a process for preparing butyl rubber the improvement which comprises preparing a butyl rubber having a molecular weight distribution of 5.0 to about 7.6 by using as the catalyst a catalytic amount of a mixture of metal compounds comprising:
   (1) at least one tetrahalide wherein said tetrahalide is the tetrahalide of a Group IV metal, and
   (2) at least one halide wherein said halide is aluminum trichloride, zinc dichloride, magnesium dichloride or gallium trichloride, or mixtures thereof, the ratio of tetrahalide to halide being about 0.1:1 to about 2:1;

wherein each of said metal compounds is an active catalyst independently capable of initiating polymerization.

2. The process of claim 1 wherein said tetrahalide is titanium tetrachloride, tin tetrachloride, or mixtures thereof.

3. The process of claim 1 wherein the halide is aluminum trichloride and the tetrahalide is titanium tetrachloride, tin tetrachloride, or mixtures thereof.

4. The process of claim 1 wherein the mole ratio of the tetrahalide to said halide is about 0.25:1 to about 1.25:1.

5. The process of claim 1 wherein the mole ratio of the tetrahalide to said halide is about 0.5:1 to about 1:1.

References Cited

UNITED STATES PATENTS

| | | | |
|---|---|---|---|
| 2,694,054 | 11/1954 | Thomas et al. | 260—85.3 |
| 2,931,791 | 4/1960 | Ernst et al. | 260—85.3 |
| 3,066,123 | 11/1962 | Strohmayer | 260—93.1 |

JOSEPH L. SCHOFER, Primary Examiner

A. HOLLER, Assistant Examiner